United States Patent
Boulby

(10) Patent No.: US 9,852,367 B2
(45) Date of Patent: Dec. 26, 2017

(54) JEWELLERY WITH TAG

(71) Applicant: KIROCO LIMITED, West Yorkshire (GB)

(72) Inventor: Simon Boulby, West Yorkshire (GB)

(73) Assignee: Kiroco Limited (GB)

( * ) Notice: Subject to any disclaimer, the term of this patent is extended or adjusted under 35 U.S.C. 154(b) by 0 days.

(21) Appl. No.: 15/440,014

(22) Filed: Feb. 23, 2017

(65) Prior Publication Data

US 2017/0185879 A1    Jun. 29, 2017

Related U.S. Application Data

(62) Division of application No. 15/173,242, filed on Jun. 3, 2016, now Pat. No. 9,613,240, which is a division of application No. 14/416,995, filed as application No. PCT/GB2013/052004 on Jul. 26, 2013, now Pat. No. 9,489,612.

(30) Foreign Application Priority Data

Jul. 27, 2012 (GB) .................................. 1213440.9

(51) Int. Cl.
| | |
|---|---|
| G08B 13/14 | (2006.01) |
| G06K 19/04 | (2006.01) |
| G06K 19/06 | (2006.01) |
| A44C 5/00 | (2006.01) |
| G06K 19/02 | (2006.01) |
| A44C 15/00 | (2006.01) |
| A44C 27/00 | (2006.01) |

(52) U.S. Cl.
CPC .......... *G06K 19/041* (2013.01); *A44C 5/0015* (2013.01); *G06K 19/02* (2013.01); *G06K 19/06196* (2013.01); *A44C 15/004* (2013.01); *A44C 27/005* (2013.01); *G06K 2019/06253* (2013.01)

(58) Field of Classification Search
CPC ....... G06Q 10/06; H04L 63/08; A44C 15/004; A44C 27/005; A44C 5/0015; G06K 19/02; G06K 19/041; G06K 19/06196; G06K 2019/06253
USPC ......................... 340/10.1–10.5, 572.1–572.9
See application file for complete search history.

(56) References Cited

U.S. PATENT DOCUMENTS

| | | |
|---|---|---|
| 4,984,683 A | 1/1991 | Eller |
| 2001/0045469 A1 | 11/2001 | Hooglander |

(Continued)

FOREIGN PATENT DOCUMENTS

| | | |
|---|---|---|
| AU | 2003203937 A1 | 12/2003 |
| CN | 102332106 A | 1/2012 |
| FR | 2790121 A1 | 8/2000 |

OTHER PUBLICATIONS

GB1213440.9, Examination Report dated Oct. 29, 2014, 4 pages.

(Continued)

*Primary Examiner* — Ojiako Nwugo

(74) *Attorney, Agent, or Firm* — Patterson Thuente Pedersen, P.A.

(57) ABSTRACT

A piece of jewellery, wherein the jewellery comprises at least one tag or chip programmed with at least a unique identification code, and a tag reader is configured to read the tag or chip when the tag reader and the piece of jewellery touch, or come into close contact and, display a message or content associated with the unique identification code.

10 Claims, 11 Drawing Sheets

(56) References Cited

U.S. PATENT DOCUMENTS

| | | |
|---|---|---|
| 2005/0068168 A1 | 3/2005 | Aupperle et al. |
| 2005/0220060 A1 | 10/2005 | Takusagawa et al. |
| 2006/0201432 A1 | 9/2006 | Pratt |
| 2007/0035401 A1 | 2/2007 | Bartz |
| 2007/0095926 A1 | 5/2007 | Zhu et al. |
| 2008/0018327 A1* | 1/2008 | Reynolds ............... B82Y 25/00 324/200 |
| 2008/0094215 A1 | 4/2008 | Amador et al. |
| 2008/0094946 A1 | 4/2008 | Stallinga et al. |
| 2008/0143476 A1 | 6/2008 | Kwok et al. |
| 2008/0168270 A1 | 7/2008 | Kulakowski et al. |
| 2008/0238627 A1 | 10/2008 | Oldham et al. |
| 2009/0201129 A1 | 8/2009 | Lane et al. |
| 2009/0212953 A1 | 8/2009 | Ross-Messemer |
| 2009/0224875 A1 | 9/2009 | Rabinowitz et al. |
| 2009/0258678 A1 | 10/2009 | Chava et al. |
| 2010/0005835 A1 | 1/2010 | Johnson, Sr. et al. |
| 2010/0182150 A1 | 7/2010 | Edelstain |
| 2011/0283754 A1 | 11/2011 | Ezzo et al. |
| 2012/0042363 A1 | 2/2012 | Moosavi et al. |
| 2012/0101830 A1 | 4/2012 | Dholakiya |
| 2012/0225250 A1 | 9/2012 | Kuznetsov et al. |
| 2012/0255331 A1 | 10/2012 | Markarian, Jr. |
| 2012/0323960 A1 | 12/2012 | Gamaley et al. |
| 2013/0043315 A1 | 2/2013 | Carr et al. |
| 2013/0140367 A1 | 6/2013 | Binmore |
| 2013/0253950 A1 | 9/2013 | Vanderpohl, III et al. |
| 2014/0102136 A1 | 4/2014 | Warren |
| 2014/0215875 A1 | 8/2014 | Raynaud |
| 2014/0292477 A1* | 10/2014 | Ahmadloo ......... G06K 7/10168 340/5.8 |
| 2015/0294214 A1 | 10/2015 | Boulby |
| 2017/0024590 A1 | 1/2017 | Boulby |

OTHER PUBLICATIONS

GB1213440.9, Search Report dated Nov. 26, 2012, 4 pages.
PCT/GB2013/052004, Search Report and Written Opinion dated Oct. 28, 2013, 15 pages.
Application and File History for U.S. Appl. No. 14/416,995, filed Jan. 23, 2015, Inventor Boulby.
Application and File History for U.S. Appl. No. 15/173,242, filed Jun. 3, 2016, Inventor Boulby.
EP16171828.3, extended European Search Report dated Sep. 14, 2016, 14 pages.
EP16171826.7, extended European Search Report dated Sep. 26, 2016, 12 pages.
EP16171826.7, Communication Pursuant to Article 94(3) EPC, dated Oct. 24, 2017, 6 pages.

* cited by examiner

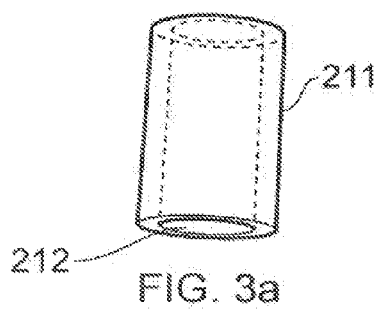
FIG. 3a
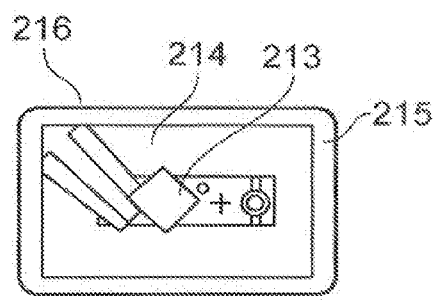
FIG. 3b
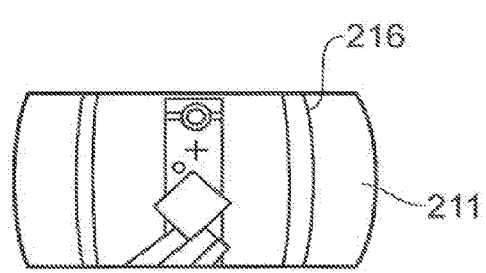
FIG. 3c
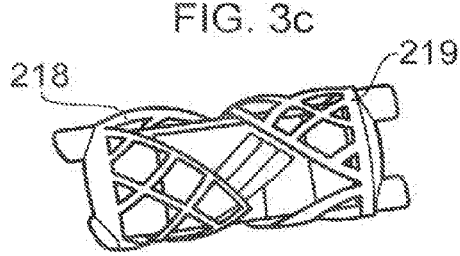
FIG. 3e
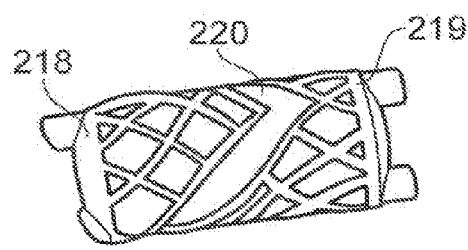
FIG. 3f
FIG. 3d
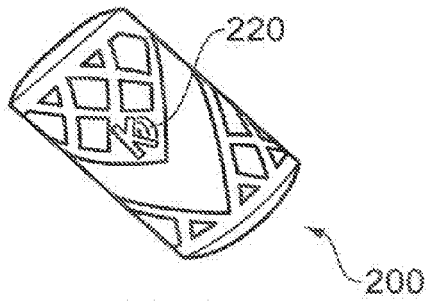
FIG. 3g

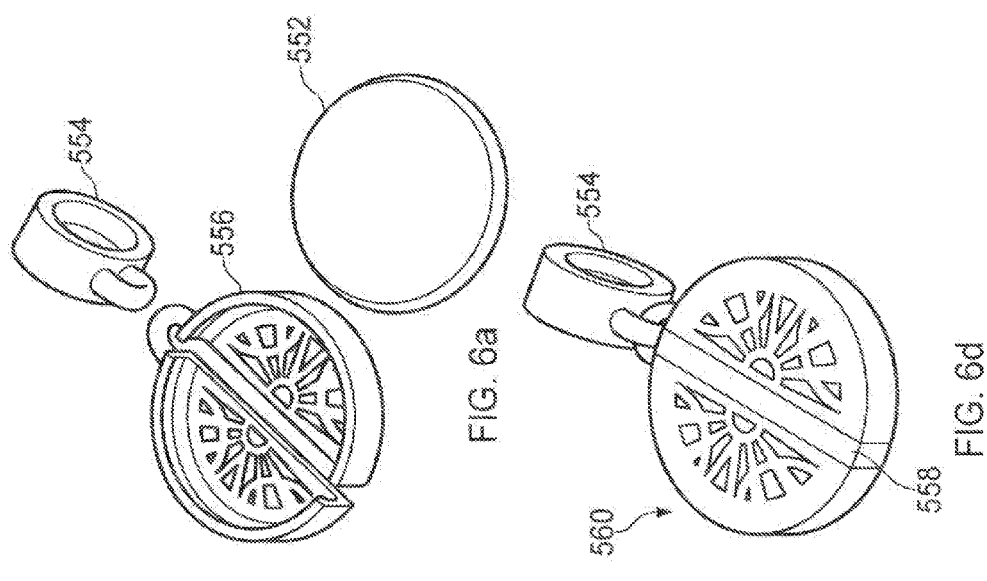
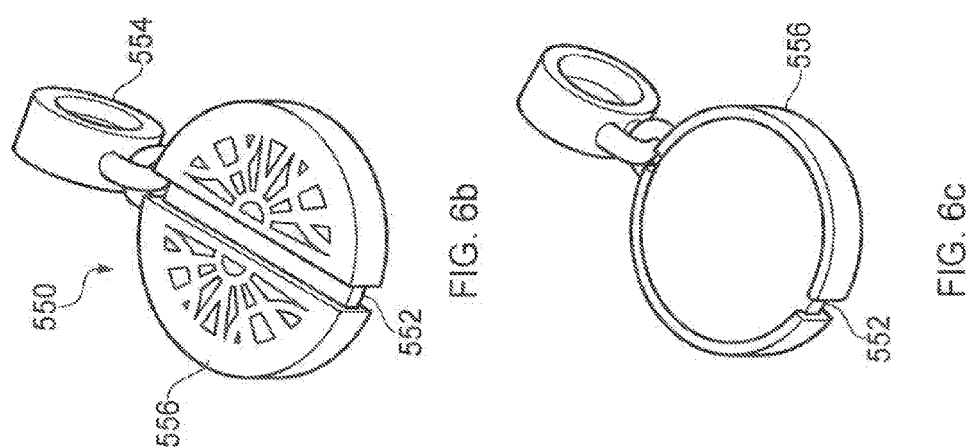

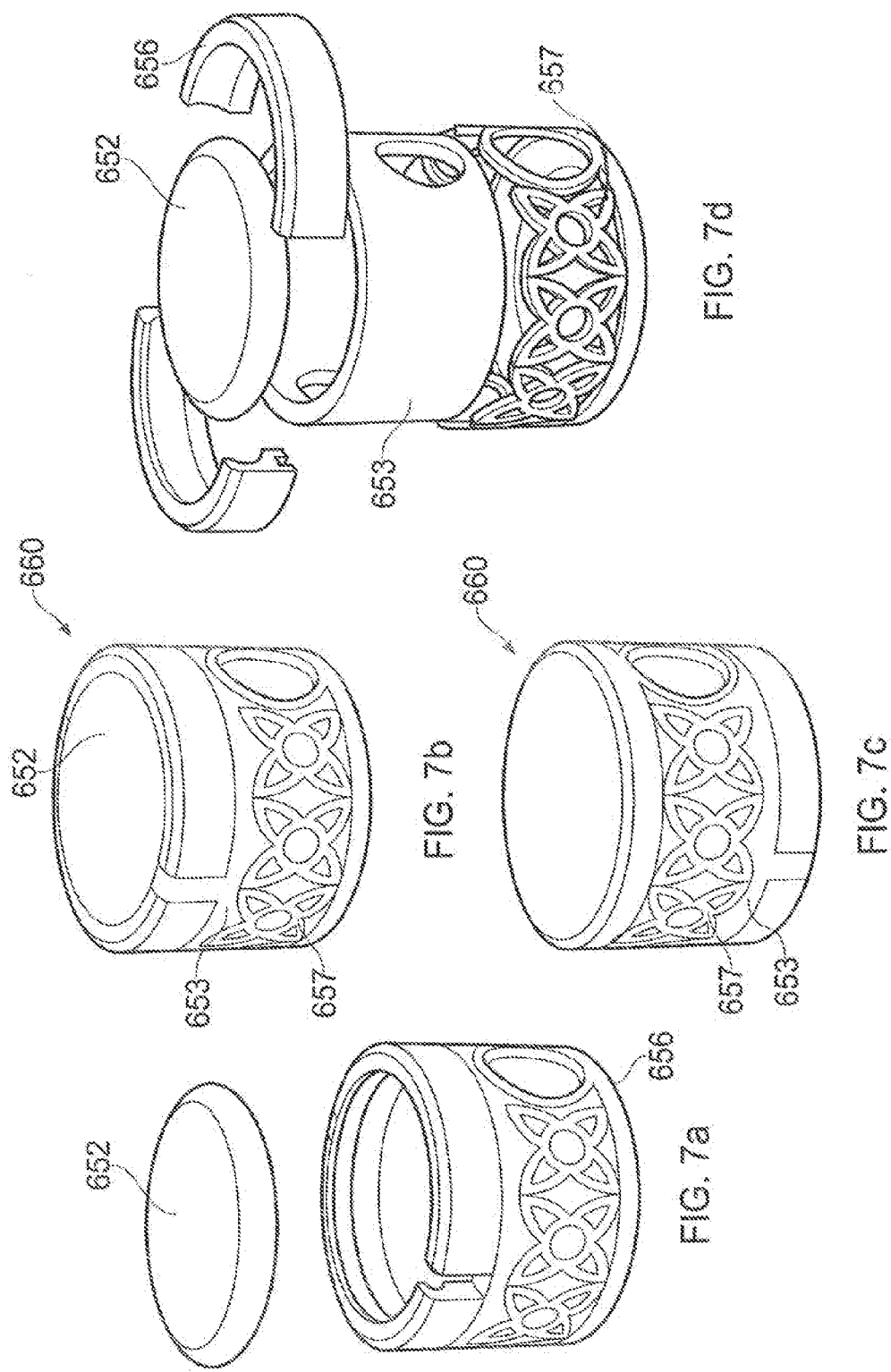

JEWELLERY WITH TAG

RELATED APPLICATION

This application is a division of U.S. application Ser. No. 15/173,242, filed Jun. 3, 2016, which in turn is a division of U.S. application Ser. No. 14/416,995, filed Jan. 23, 2015, now U.S. Pat. No. 9,489,612, which claims the benefit of PCT/GB2013/052004, filed Jul. 26, 2013, which claims the benefit of GB Patent Application No. 1213440.9, filed Jul. 27, 2012, each of which is hereby fully incorporated herein by reference.

FIELD OF INVENTION

This invention relates to a piece of jewellery, wherein the jewellery comprises at least one tag or chip programmed with at least a unique identification code, and a tag reader is configured to read the tag or chip when the tag reader and the piece of jewellery touch, or come into close contact and, display a message or content associated with the unique identification code.

BACKGROUND

Items of jewellery are often given as gifts to signify important moments in a life such as a wedding or engagement, birthdays, or other celebrations. Items of jewellery include rings, pendants, bracelets, beads, brooches and the like. Often the gift giver opts to engrave the item to impart a special personal message for the recipient: "I love you" or perhaps even "For you, on our wedding day $12^{th}$ August 2006" or "Congratulations on passing your exams". Typically, wedding, engagement and eternity rings are engraved on the inner surface of the ring in a symbolic gesture of intimacy; only the giver and receiver need know the message is there and what the message is. Celebration jewellery, given to a recipient to mark an important life event, may include a bracelet or necklace with charms, beads, or pendants, and these items may also be engraved with a message or date adding that personal intimate touch Engraving items or pieces of jewellery may require some skill, time, and effort and often requires some sort of machinery or engraving tool. It can be difficult to engrave very small pieces of jewellery and especially challenging to engrave pieces of jewellery with patterned or contoured surfaces. Furthermore, there is a limited space in which a person may engrave a message on any piece of jewellery and the character size is limited so the resultant content of the message is also limited. For example, the message on the inside of a wedding band is typically restricted to only a few characters, for example 25 characters. Clearly any such message is thus very limited.

Radio-frequency identification (RFID) uses radio-frequency electromagnetic fields to transfer data from a tag or chip attached to an object, principally for the purposes of automatic identification (e.g. allowing a person access to a building) and tracking and monitoring products (such as stocktaking or assembly line monitoring). Some tags or chips are passive and do not require a battery. Passive tags or chips are powered by the electromagnetic fields used to read them. Non passive tags or chips use a local power source and emit radio waves (electromagnetic radiation at radio frequencies). The tag or chip contains electronically stored information which can be read by a reader from up to several meters away. Near field communication (NFC) is a set of standards covering communications protocols based on existing RFID. NFC requires touch or bringing a reader and tag into close proximity to each other in order to establish radio communication with each other.

The prior art shows a variety of uses of RFID tags and chips. International patent application WO 2011/154213A provides a system for monitoring the stock in dynamic stores using RFID and discloses an RFID communication system, comprising at least a first stationary RFID antenna and a second stationary RFID antenna for transmitting and receiving data; and an RFID transponder fitted to an item or a group of items, wherein the RFID transponder electronically stores at least one identifier of the item or the group of items, and wherein the first RFID antenna is placed at an intake region and the second RFID antenna is placed at an issue region of a storage path of the dynamic store in order to detect the item or the group of items using the identifier of the RFID transponder.

Taiwanese patent application TW 2009/19344A discloses the use of RFID tags in ticket applications. An anti-counterfeiting electronic ticket system is disclosed, which is used as an anti-counterfeiting application to prevent a simple electronic ticket from misuse of an illegal duplication means by means of a photographing method. A certificate can be an image, a pattern or words, and is printed on a sticker or on the surface of other entity articles by means of an anti-counterfeiting printing technology. Alternatively, the certificate can be a wireless radio frequency identification (RFID) label to form an entity certificate. A user holds an electronic ticket image displayed on a monitor of a mobile apparatus and a pre-registered entity certificate, utilizes a ticket-examining apparatus to read content information of the entity certificate and the electronic ticket, and verifies by mutual certification method of the two to be used as imitation prevention of the electronic ticket.

BRIEF SUMMARY OF THE DISCLOSURE

In accordance with a first aspect of the present invention, there is provided an item of jewellery with at least one passive tag, wherein the passive tag is programmed with at least a unique identification code, and wherein the unique identification code, when read from the passive tag by a tag reader having a display, authorises access to a message or content associated with the unique identification code, the message or content to be displayed on the display of the tag reader.

Preferably, the at least one tag is a radio frequency identification (RFID) tag or chip configured to operate as a near field communication (NFC) tag or chip. The tag may be any tag adapted to use near-field communication technology.

In some embodiments the at least one tag or chip operates on a very small range of less than about 1 cm.

In certain embodiments the at least one tag or chip is positioned on or in the item of jewellery and coated with a resin, glass or metal to protect the chip or tag. The positioning of the at least one tag or chip provides three dimensional readability of the tag or chip by the tag reader.

The tag reader may be a personal electronic device such as a smartphone or tablet computer.

In other embodiments the at least one tag or chip is layered on the surface of the item of jewellery.

In accordance with a second aspect of the present invention, there is provided a system comprising an item of jewellery with a passive tag, and a tag reader with a display, wherein:

the passive tag is programmed with at least a unique identification code;

the tag reader is adapted to read the identification code from the passive tag when the tag reader and the item of jewellery touch, or come into close proximity with each other; and the tag reader is configured to access a message or content that is associated with the unique identification code and to display the message or content on the display.

Preferably, the reader is adapted to go through an authorization stage whereby the unique identification code of the tag and an authorisation code assigned to the reader must match before the tag reader can access the message or content assigned to the identification code of the tag.

The message or content may be stored on a remote data storage device (such as a remote server, or cloud data storage system), and the tag reader may be configured to be able to communicate with the remote data storage device.

In particularly preferred embodiments, the tag reader is configured as a smart phone or similar communications device having tag reading functionality as well as being able to connect to the Internet.

In some embodiments, the tag reader is adapted to preload the message or content assigned to the unique identification code so that once preloaded, when the item of jewellery with a passive tag come into contact or close proximity to one another, the associated message or content is instantly displayed and the reader does not rely on connectivity with the remote data storage device.

In a third aspect of the present invention, there is provided a method of delivering an electronic message, including:

i) providing an item of jewellery with a tag having a unique identification code, ii) reading the unique identification code from the tag with a tag reader, and iii) using the unique identification code to request delivery of a message or content associated with the unique identification code to the tag reader to be displayed on the display of the tag reader.

Preferably, request delivery of a message includes authorising delivery of a message.

Preferably, the tag reader can only access the message or content associated with the unique identification code if it is authorised to do so. The tag reader is provided with an authorisation code such as an IP address, SIM number, or mobile application identification number. The authorisation code of the tag reader and the tag need to match in order for the message to be delivered.

NFC tag readers work in a standardised manner, such that all tags can be read by all readers. However, the present invention relies on the fact that only authorised users can access their messages (i.e. only the wearer of the jewellery or individuals that the wearer has explicitly granted access should be able to retrieve messages intended for their consumption). To ensure that only authorised access is permitted the system registers a pairing between the end user's mobile application ID number and each of the ID numbers of the items of jewellery they currently own. Any subsequent access to the messages stored for a particular item of jewellery is only granted to the mobile application running on the tag reader, such as a smartphone, that the item of jewellery was registered as being paired with (i.e. the tag reader, such as a smartphone, of the recipient of the jewellery). In addition, extended access to an item of jewellery's messages may be granted, but only if the wearer explicitly identifies the ID number of the additional authorised mobile applications (i.e. the smartphones of trusted friends or relatives).

In a fourth aspect, there is provided a method of manufacturing a piece of jewellery comprising a passive tag, the method comprising the steps of:

a) selecting a bead of desired size, the bead having an inner passageway;

b) selecting a passive tag sized such that a surface area of the passive tag is smaller than a surface area of the bead;

c) positioning the passive tag on an outer surface of the bead;

d) positioning a reticulated mesh over the bead and passive tag, the reticulated mesh having a passive tag indicator;

e) checking the passive tag's readability with a reader, the reader positioned in the region of the passive tag indicator;

f) coating the mesh in enamel or resin heated to less than 100° C. to fill the gaps in the mesh;

g) filing and polishing the enamel or resin;

h) checking a readability of the passive tag with a reader in the region of the passive tag indicator.

Manufacturing the bead is particularly challenging because the normal techniques used to manufacture pieces of jewellery may damage the passive tags. The present method provides steps to ensure that passive tags are not damaged during manufacture of the beads by protecting the passive tag using a mesh and by adding enamel or resin at temperatures less than 100° C.

BRIEF DESCRIPTION OF THE DRAWINGS

Embodiments of the invention are further described hereinafter with reference to the accompanying drawings, in which:

FIGS. 3a-3g show a lattice type cylindrical bead;

FIGS. 6a-6d show a disk-like bead;

FIGS. 7a-7d show a drum-like bead; and

DETAILED DESCRIPTION

In the described embodiments, like features have been identified with like numerals, albeit in some cases having increments of integer multiples of 100. For example, in different figures, 210, 310, and 410 have been used to indicate bead comprising a passive tag.

Figure 1:
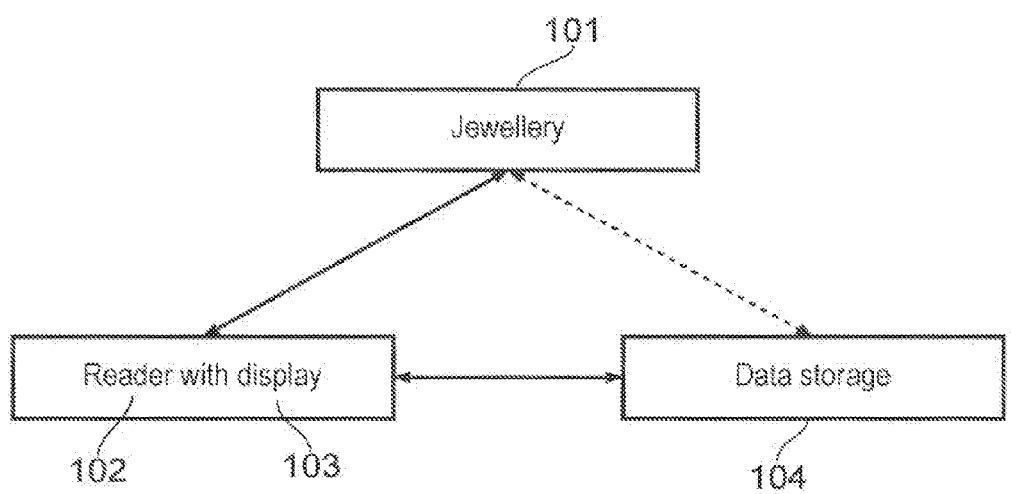
FIG. 1 is a shows a schematic of the system.

FIG. 1 shows a schematic of the system including a piece of jewellery 101, a reader 102 with a display 103 and a remote data storage device 104 to support the reader. The solid lines indicate the communication path and the dotted line indicates the indirect communication path because the jewellery and the data storage device communicate through the reader. The jewellery includes a passive tag or chip within the jewellery or positioned on the jewellery. When the jewellery comes into contact (i.e. touches) or comes into close proximity with a reader in a range of about 0 cm to about 1 cm, the passive tag or chip is energised by the electromagnetic field of the reader.

Each piece of jewellery is assigned a unique identification code within the passive tag or chip. Initially, the remote data storage device is configured to assign a corresponding access code to a particular reader such as the recipient's (i.e. the jewellery wearer's) personal communication device or smart phone. Once the jewellery and smart phone are linked, only the linked smart phone may display information linked to the unique identification code associated with the passive tag or chip. In this manner, the tag reader (or smart phone) is the only authorised reader (i.e. the jewellery wearer's smartphone) allowed to access messages associated with the particular unique identification code of the piece of jewellery.

The system is designed to be easily used by the recipient of the item of jewellery. All interaction with the jewellery and its associated messages is performed through a mobile application.

The giver of the jewellery may at any time update the message they wish to be associated with the item of jewellery they have gifted, in order to convey emotions of significance based around their relationship with the jewellery wearer (e.g. birthday or anniversary messages) or seasonal messages such Christmas or Easter well wishes, and so on. To achieve this, any purchaser of an item of jewellery is provided with a personal account (accessed via a personal website area or via their mobile app). This personal account can be associated with multiple items or jewellery and allows the giver of those items to update messages associated with them all from one location. In addition to text based messages the giver of the jewellery can also incorporate pictures and videos.

Once the giver of the jewellery has updated a message associated with a particular piece of jewellery the system then transfers the message between the remote data storage facility and the authorised mobile application automatically and transparently to the user as soon as a suitable data connection is present (i.e. the user is unaware of the message transfer process taking place in the background). Once transfer is complete the message is then stored indefinitely in the smartphone's non-volatile memory ready for immediate access by the user. This process ensures that when the user attempts to access their messages by "touching" their smartphone and their item of jewellery together, their message is immediately accessed and launched from the smartphone's memory thus giving a smooth and consistent service irrespective of other factors such as the smartphone's current mobile network signal. The message remains in the smartphone's non-volatile memory until it is explicitly deleted by the mobile application (thus giving the opportunity for the jewellery to give the impression it is holding multiple messages if required).

The message may be anything from the "I love you" one might expect to find engraved on the surface of a piece of jewellery, to something more personal and intimate, only to be shared between the giver of the jewellery and recipient (i.e. the jewellery wearer). It is envisaged that the message may include more substantial data such as photographs, voice recordings and longer messages. In this manner, the piece of jewellery may be thought of as an "i-motion" or "personal emotional messaging" device that may be used as a time capsule. A time capsule includes a plurality of messages or alternatively a plurality of beads on a bracelet or necklace, each bead with a unique identification number whereby the giver of the piece of jewellery can save important messages and mark special occasions associated with the piece of jewellery forever.

Figure 2:
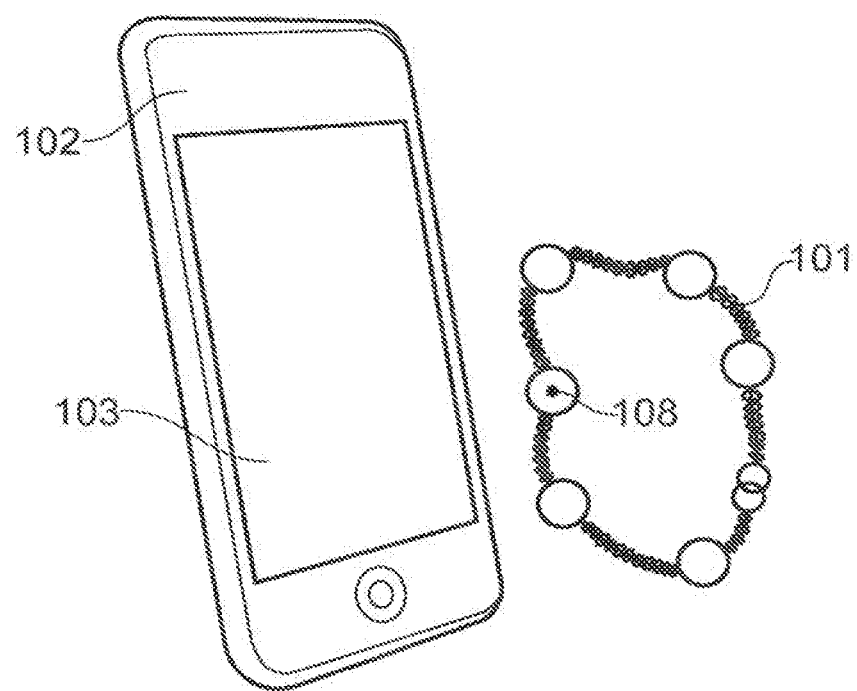
FIG. 2 illustrates a bracelet and reader with a display.
Figure 4A:
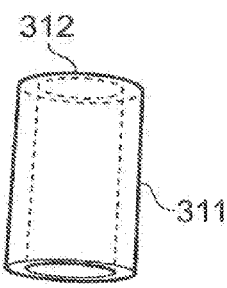
FIGS. 4a-4h show a plain cylindrical bead.
Figure 4B:
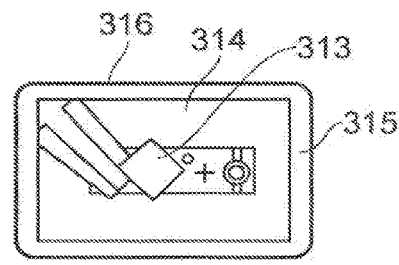
Figure 4C:
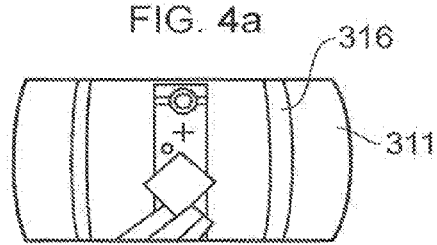
Figure 4D:
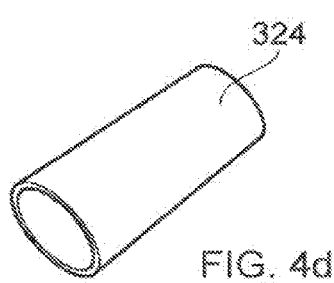
Figure 4E:
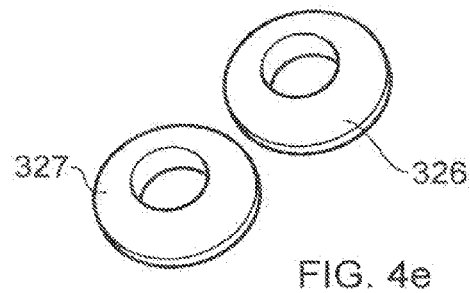
Figure 4F:
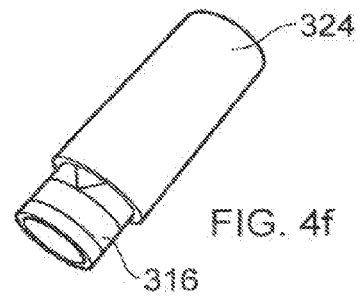
Figure 4G:
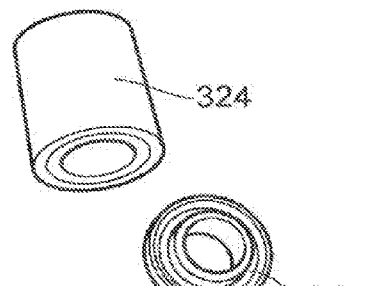
Figure 4H:
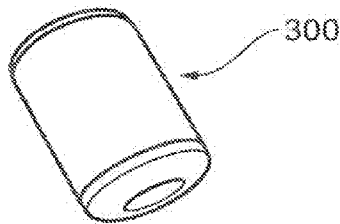
Figure 5A:
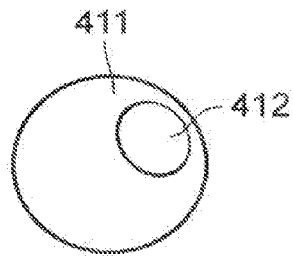
FIGS. 5a-5g show an orb type lattice bead.
Figure 5B:
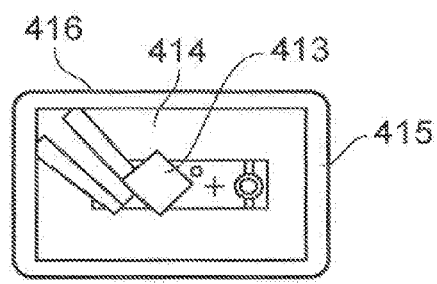
Figure 5C:
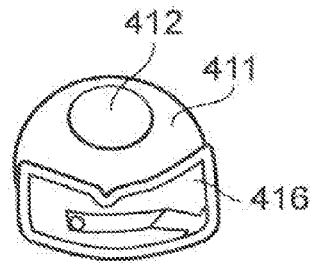
Figure 5D:
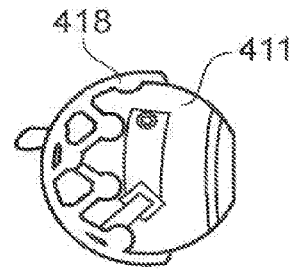
Figure 5E:
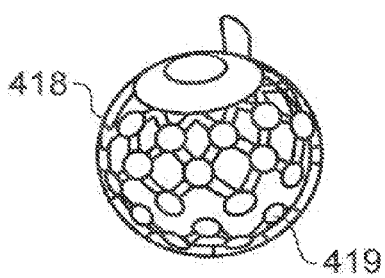
Figure 5F:
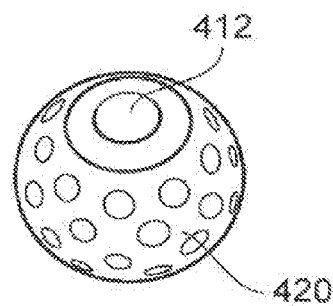
Figure 5G:
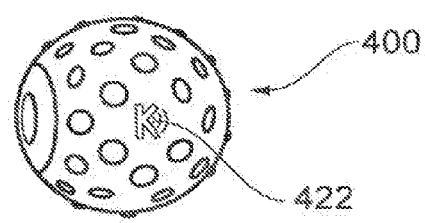
Figure 8A:
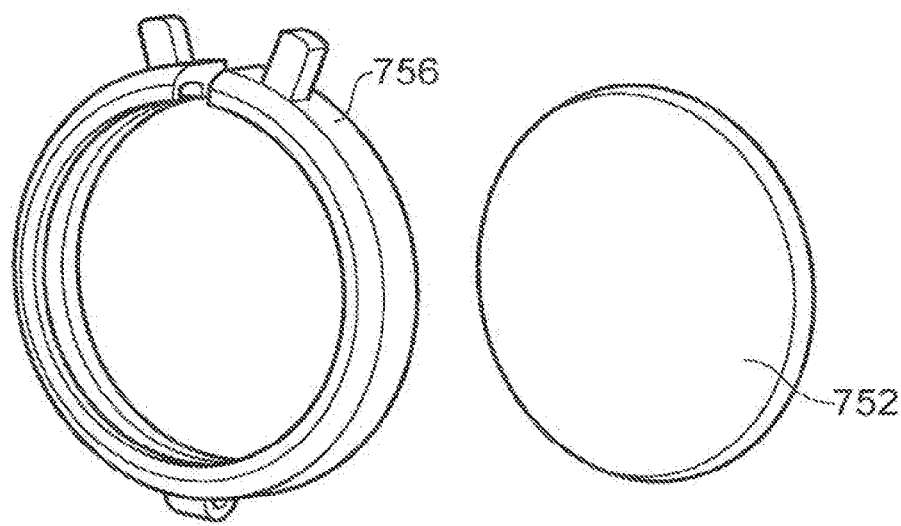
FIGS. 8a-8f show a locket-type bead.
Figure 8B:
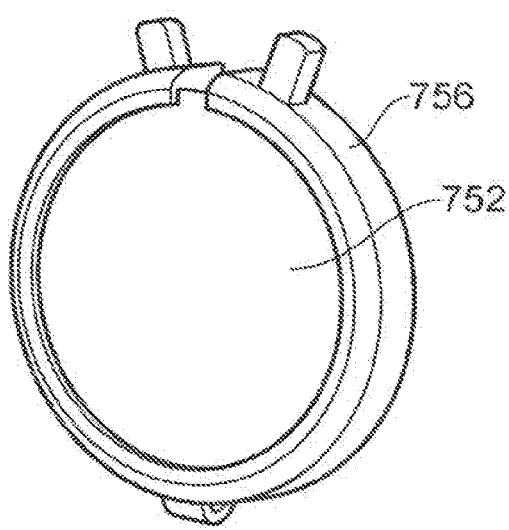
Figure 8C:
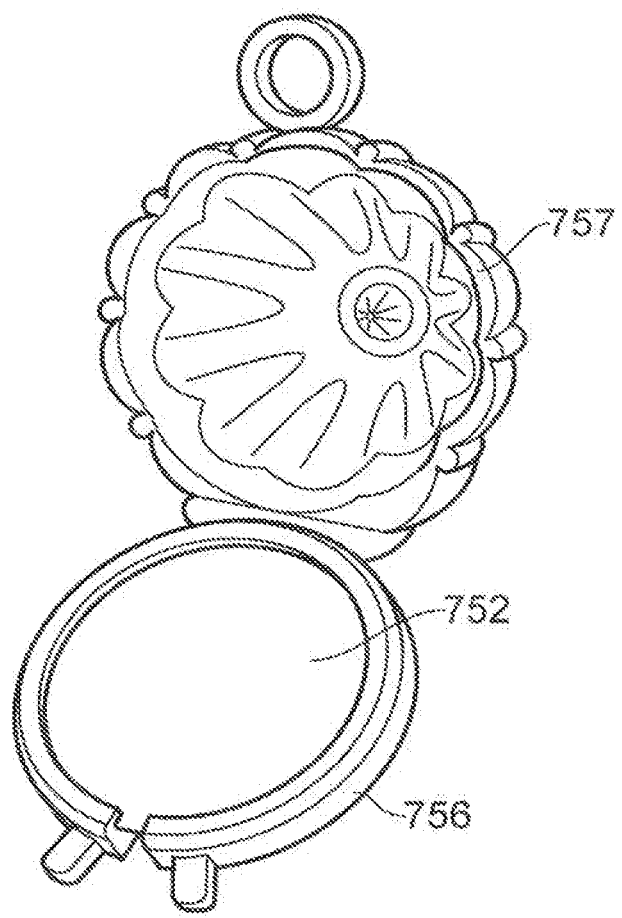
Figure 8D:
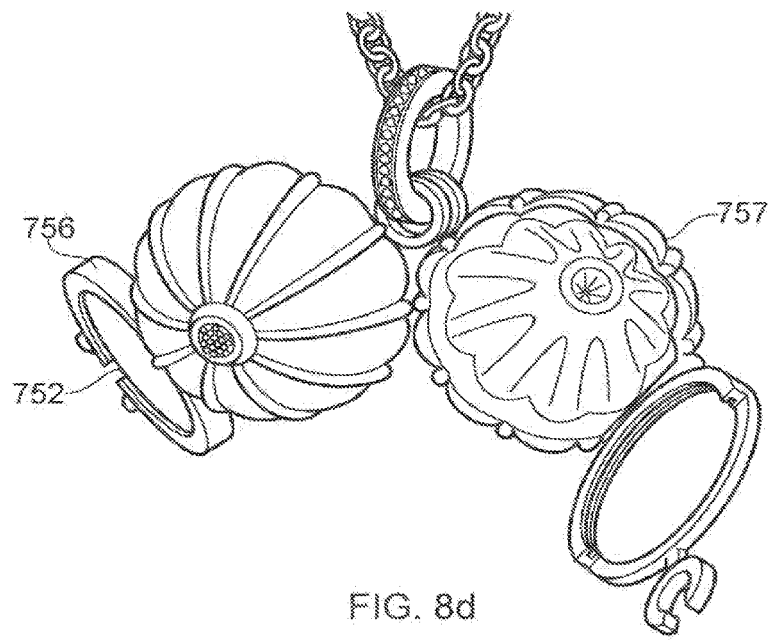
Figure 8E:
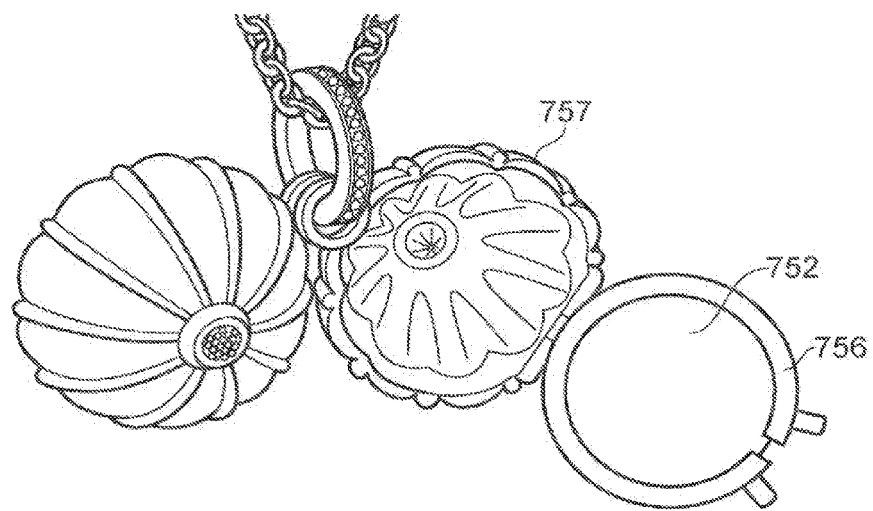
Figure 8F:
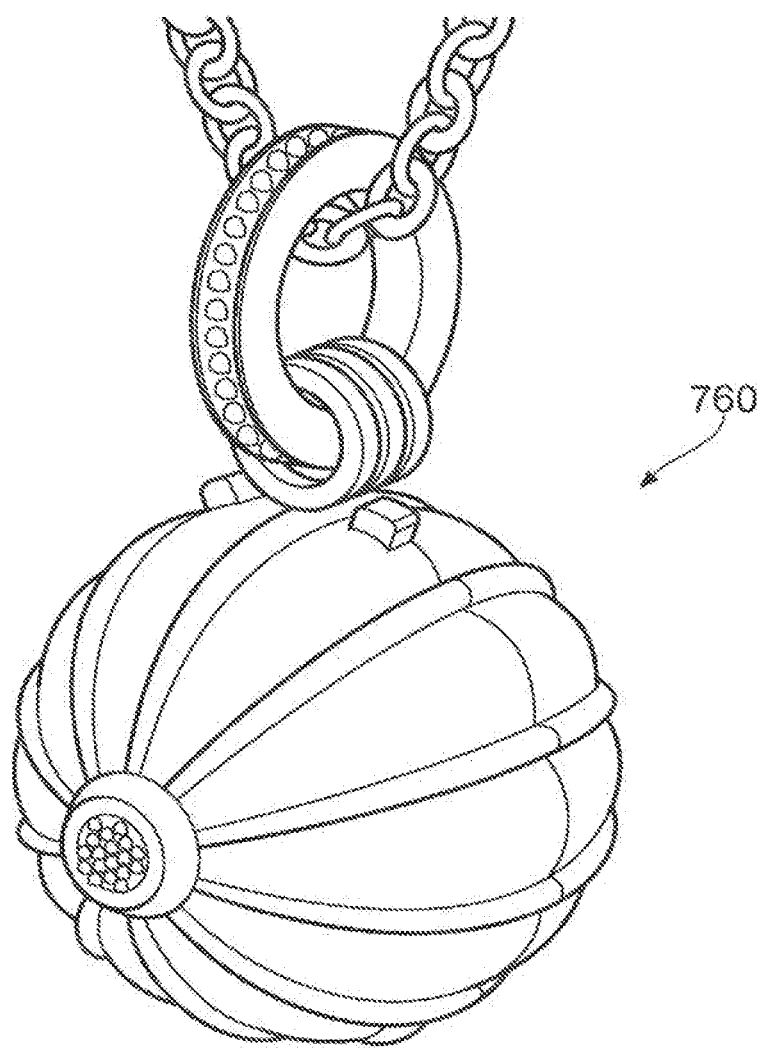

FIG. 2 illustrates a preferred embodiment of the present invention. FIG. 2 depicts an item of jewellery such as a simple bracelet of beads 101. The bracelet has a plurality of beads, one of which includes a tag within or on it 108. A smartphone 102, 103 is also depicted with a reader 102 and a display 103. NFC chips or tags are particularly suitable for the present invention as their range is small and NFC chips or tags require near touch between the tag and the tag reader in order to activate the tag.

The present inventors have developed a method for positioning the tags and antenna onto the surface of the bead and a thin layer of resin to coat the bead and therefore embed the tag within the bead. Resins are particularly good for protecting the NFC tags and antennas and also have decorative properties. Other materials as well as resins may be used including some metals, glasses, and polymer products.

It should be noted that other passive chips or tags could also be used in place of an NFC chip. For example, longer range RFID chips and tags may be used. In fact, any RFID or near-field communication technology may be used.

Embedding multiple tags or chips within or on an item of jewellery will be beneficial and desirable for a number of different purposes.

Using multiple tags or chips provides good three dimensional readability of the jewellery by the tag reader. To improve the likelihood that an item of jewellery will be read immediately by the reader, certain items will be produced with multiple tags that are all associated with the same message storage account on remote data storage facility. This ensures that irrespective of which tag is read on that individual piece of jewellery the message retrieved will always be from the same associated message account. For example, this approach may be adopted in items of jewellery such as bracelets where tag locations can potentially alter through the general movement of the wearer. By incorporating multiple tags throughout the bracelet, the user will be more likely to create a connection with one of the tags, irrespective of how the bracelet has moved on their wrist during the course of the day.

Alternatively, larger items of jewellery or jewellery with distinct sections may benefit from the ability to incorporate multiple tags with ID numbers that are each individually associated with different message storage accounts. In this case, if one tag in a specific part of the jewellery was read it will retrieve a message from a different message storage account than a tag embedded in a different section of the same piece of jewellery. An example of where this functionality would be suitable is within a "Charm" bracelet. These items of jewellery typically have a simple bracelet band that the wearer then adds small jewellery accessories to (known as Charms). Typically each individual Charm is often bought for the wearer by different people. In this case, a Kiroco-Touch system (an application) will offer the ability for the wearer to receive separate messages from each person who bought each individual Charm.

Other embodiments such as beads of other shapes, rings, pendants, and brooches may also have NFC chips and antennas embedded within them.

The system disclosed may also be used in other applications such as security, for example, using the i-motion messaging device for the identification of stolen jewellery. Furthermore, the system may also be used for promotional information or event information for events such as festivals, whereby event information is disseminated to the jewellery.

Manufacturing a piece of jewellery containing a NFC chip or tag is challenging since the processes typically carried out in manufacturing a piece of jewellery often include high temperatures and abrasive mechanical treatment of the piece of jewellery. However, after much trial and error, a method for manufacturing a piece of jewellery comprising at least one passive tag, such that the tag does not undergo undue mechanical and thermal conditions, has been developed by the present Applicant.

The method of manufacturing a piece of jewellery comprising a passive tag includes selecting a bead 210 of desired size, the bead comprising an inner passageway 212.

FIGS. 3 to 5 show the manufacturing steps required to manufacture a piece of jewellery comprising a passive tag. FIG. 3 shows a lattice type cylindrical bead. FIG. 4 shows a plain cylindrical bead. FIG. 5 shows an orb type lattice bead.

A passive tag 216 is selected for size such that the surface area of the passive tag is smaller than a surface area of the bead. The passive tag includes a substrate 215, a tag 213 and an antenna 214. The passive tag 216 is positioned on the surface of the bead. The passive tag 216 may be simply rested on the surface, or alternatively it may be adhered to the surface of the bead. The passive tag may be retained on the surface of the bead by an outer layer such as a reticulated mesh structure 218, 219. In that sense, it may not need to be adhered using glue, but may simply be positioned on the bead.

A reticulated mesh structure 218, 219 is adapted to encompass the bead and is positioned over the bead. The reticulated mesh has a first 218 and a second portion 219. Furthermore, the reticulated mesh has a portion adapted to allow the end user to locate the passive tag. As such, the mesh is provided with a passive tag indicator 222.

The reticulated mesh is formed from two interlinking portions adapted to link together to form a decorative covering. The mesh is configured so as not to form a significant RF barrier between the passive tag and the tag reader. This is achieved by providing the mesh with a hole size.

Once the reticulated mesh is positioned over the bead, the readability of the passive tag is checked by positioning a passive tag reader (not shown) in the region of the passive tag indicator 222.

The reticulated mesh structure 218, 219 is then coated using enamel or resin 220 to fill the gaps in the mesh. It is beneficial to over fill the mesh with enamel or resin to ensure no defects are formed when the enamel or resin sets. The enamel or resin is heated to temperatures sufficient to make the enamel or resin malleable, but not heated above 100° C., as temperatures above 100° C. have been found to damage the tags.

Once the enamel or resin 220 has set, the excess enamel or resin is filed using a variety of different grade abrasive materials until the reticulated mesh structure is smooth and has the desired appearance.

Finally, the bead 210 is checked again to ensure it remains readable at the passive tag indicator 222.

FIG. 4 shows a plain cylindrical bead 310 having two end caps, 326, 327, separated by a cylindrical tube 324. The bead is manufactured using the same steps as in the mesh covered bead, however, the mesh is replaced by the cylindrical tube and no additional enamel of resin is required. The cylindrical tube covers the passive tag, and the cylindrical tube and end fittings are polished.

FIG. 5 shows an orb bead 410. The tag 416 may be simply rested on the surface of the orb, or alternatively it may be adhered to the surface of the orb. A two part mesh 418, 419 encompasses the bead and is positioned over the bead. The mesh formed by the two parts 418, 419 has a portion adapted to allow the end user to locate the passive tag. As such, the orb is provided with a passive tag indicator 422 in the mesh.

FIG. 6 shows a disk-like unfinished bead 550. Using a pre-coated passive tag 552 arrangement, the mesh support casing 556 only covers one side of the disk-like bead 550. The bead is held on a loop 554, and the mesh 556 forms a substantially U-shape and is configured to accommodate the pre-coated passive tag 552. Once the pre-coated passive tag is in position, the mesh support casing 556 is filled with enamel or resin 558. The finished disk-like bead 560 is then polished to remove any excess enamel and to polish the mesh.

FIG. 7 shows a cylindrical drum-like unfinished bead 650 incorporating a pre-coated passive tag 652. The bead has a mesh support casing 656 with a decorative open cell design 657. The pre-coated passive tag 652 forms a lid of the drum-like unfinished bead 650, and the mesh support 656 surrounds the tag 652. Enamel or resin 658 is used to fill the space between the mesh support, within the decorative open cell design 657 and the tag 652. The open cell design is adapted to reduce interference between the tag 652 and a tag reader.

FIG. 8 shows a locket-type bead 760 incorporating a pre-coated passive tag 752 held in a ring-type casing 756. The casing 756 is configured to surround the outer circumference of the tag 752. The casing 756 and tag 752 are held in an orb shaped bead 757 which is made up of two dome shaped parts. The casing 756 and tag 752 may be designed to form a hinge with one of the domes, and therefore fold together in a compact manner. The two domes may be linked together on a chain or string, via a hoop. The other dome shaped part may be used to incorporate something chosen by the user, such as a lock of hair, or a photograph. The passive tag is accessed by opening the locket-type bead 760 by sliding the two domes relative to each other. The hoop acts as a pivot for the sliding motion of the two domes.

FIGS. 3 to 8 show a selection of many different types of beads having passive tags incorporated in some manner. Other methods may be used to incorporate passive tags into other pieces of jewellery in addition to those shown in FIGS. 3 to 8.

It is important that the passive tag does not experience temperatures above the temperature acceptable for the passive tag. Typically, temperatures below 100° C. are acceptable and do not unduly affect the readability of characteristics of the passive tags.

The materials used to manufacture the beads are preferably resistant to solvents such as acetone and methyl ethyl ketone.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclu- The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An item of jewellery comprising:
 a first and a second passive tags, wherein the first and second passive tags are provided with a first and a second antenna;
 at least one bead, ring, bracelet or pendant;
 wherein the first and second passive tags are located on an outer surface of the bead, ring, bracelet or pendant, and wherein the bead, ring, bracelet or pendant further includes a layer of resin, glass, or a polymeric material on the outer surface of the head, ring, bracelet or pendant, such that the first and second passive tags are embedded in the layer of resin, glass or the polymeric material on the outer surface of the bead, ring, bracelet or pendant; and
 wherein each of the first and second passive tags are programmed with at least a unique identification code, and each unique identification code is associated with different data.

2. The item of jewellery as claimed in claim 1, wherein the first and second passive tags are a radio frequency identification (RFID) tags or chips configured to operate as a near field communication (NFC) tags or chips.

3. The item of jewellery as claimed in claim 2, wherein the first and second passive tags or chips operate on a very small range of less than about 1 cm.

4. The item of jewellery as claimed in claim 3, wherein the first and second passive tags or chips are positioned on or in the item of jewellery to provide three dimensional readability of the fust and second passive tags by a tag reader.

5. The item of jewellery as claimed in claim 4, wherein the first and second passive tags are layered on to the surface of the item of jewellery.

6. A system comprising an item of jewellery, a tag reader having a display and a passive tag reading functionality, and remote data storage device, wherein:
 the tern jewellery comprises:
 a first passive tag and a second passive tag, wherein the first and second passive tags are provided with a first and a second antenna;
 at least one bead, ring, bracelet or pendant;
 wherein the first and second passive tags are located on an outer surface of the bead, ring, bracelet or pendant, and wherein the bead, ring, bracelet or pendant further includes a layer of resin, glass, or a polymeric material on the outer surface of the bead, ring, bracelet or pendant, such that he first and second passive tags are embedded in the layer of resin, glass or the polymeric material on the outer surface of the bead, ring, bracelet or pendant; and
 wherein each of the first and second passive tags are programmed with at least a unique identification code, and each unique identification code is associated with different data; and
 wherein the tag reader is adapted to read the at least one identification code from the embedded first and/or second passive tag when the tag reader and the item of jewellery touch the first and/or the second passive tag, or come into close proximity with each other; and
 the tag reader is configured to access data that is associated with the unique identification code, the data including a message or content, and to retrieve and display the message or content on the display.

7. The system according to claim 6, wherein the tag reader is adapted to go through an authorisation stage whereby the unique identification code of the tag and an authorisation code assigned to the tag reader must match before the tag reader can access the message or content assigned to the identification code of the tag.

8. The system according to claim 7, wherein the message or content may be stored on a remote data storage device, and the tag reader is configured to be able to communicate with the remote data storage device.

9. The system according to claim 7, wherein the tag reader is able to connect to the Internet.

10. The system according to claim 7, wherein the tag reader is adapted to preload the message or content assigned to the unique identification code so that once preloaded, when the item of jewellery with a passive tag come into contact or close proximity to one another, the associated message or content is instantly displayed by the tag reader on a display.

* * * * *

UNITED STATES PATENT AND TRADEMARK OFFICE
CERTIFICATE OF CORRECTION

Page 1 of 1

PATENT NO. : 9,852,367 B2
APPLICATION NO. : 15/440014
DATED : December 26, 2017
INVENTOR(S) : Boulby It is certified that error appears in the above-identified patent and that said Letters Patent is hereby corrected as shown below:

In the Claims

Column 9, Line 24, Claim 1, please delete "head" and insert in its place --bead--.

Signed and Sealed this
Sixth Day of February, 2018

Joseph Matal
*Performing the Functions and Duties of the
Under Secretary of Commerce for Intellectual Property and
Director of the United States Patent and Trademark Office*